Figure 3:
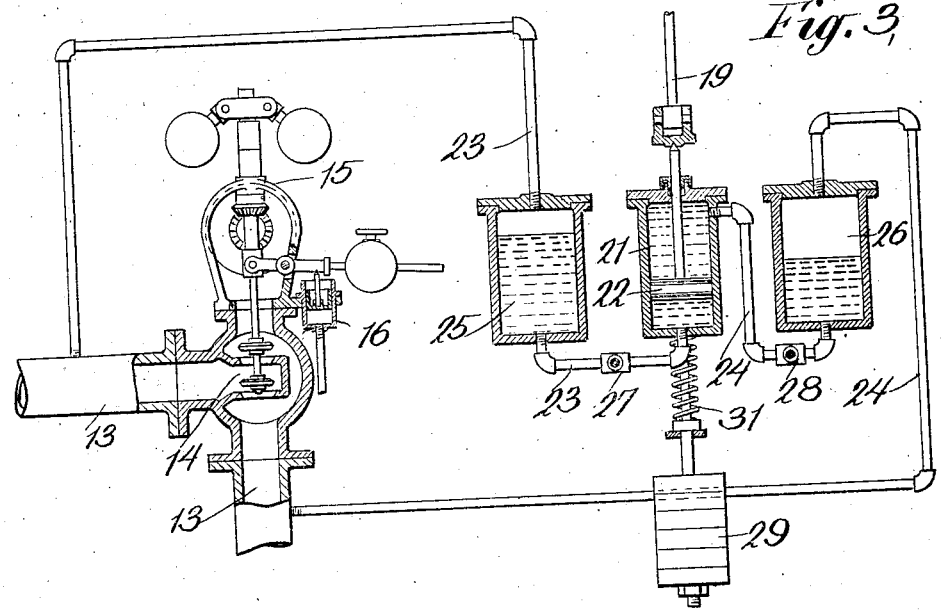

C. A. DAWLEY.
GOVERNING VALVE GEAR FOR FLUID PRESSURE MOTORS.
APPLICATION FILED JULY 26, 1906.
1,042,534.
Patented Oct. 29, 1912.
4 SHEETS—SHEET 1.
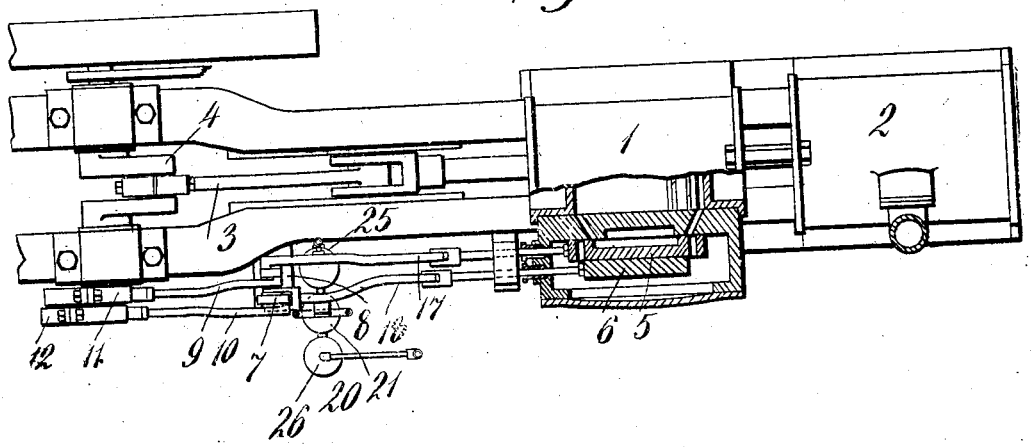
Fig. 1.
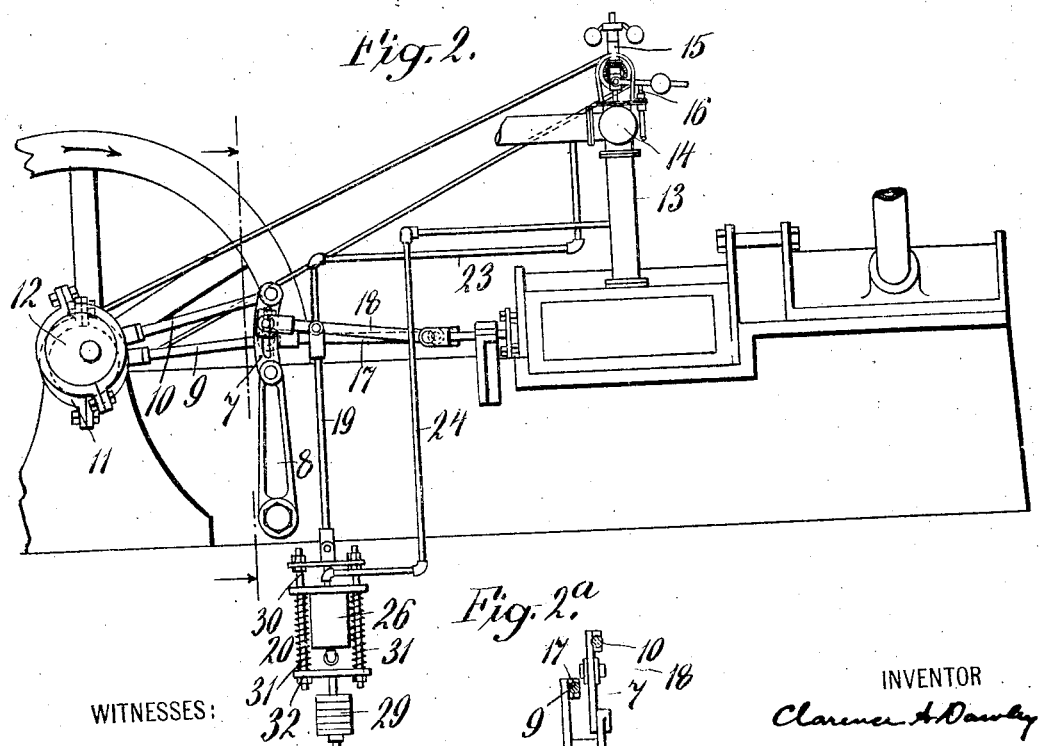
Fig. 2.
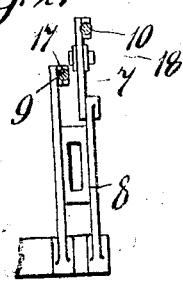
Fig. 2ª
WITNESSES:
A. M. Houghton
INVENTOR
Clarence A. Dawley
BY
ATTORNEYS C. A. DAWLEY.
GOVERNING VALVE GEAR FOR FLUID PRESSURE MOTORS.
APPLICATION FILED JULY 26, 1906.

1,042,534.

Patented Oct. 29, 1912.
4 SHEETS—SHEET 2.

C. A. DAWLEY.
GOVERNING VALVE GEAR FOR FLUID PRESSURE MOTORS.
APPLICATION FILED JULY 26, 1906.
1,042,534.
Patented Oct. 29, 1912.
4 SHEETS—SHEET 3.
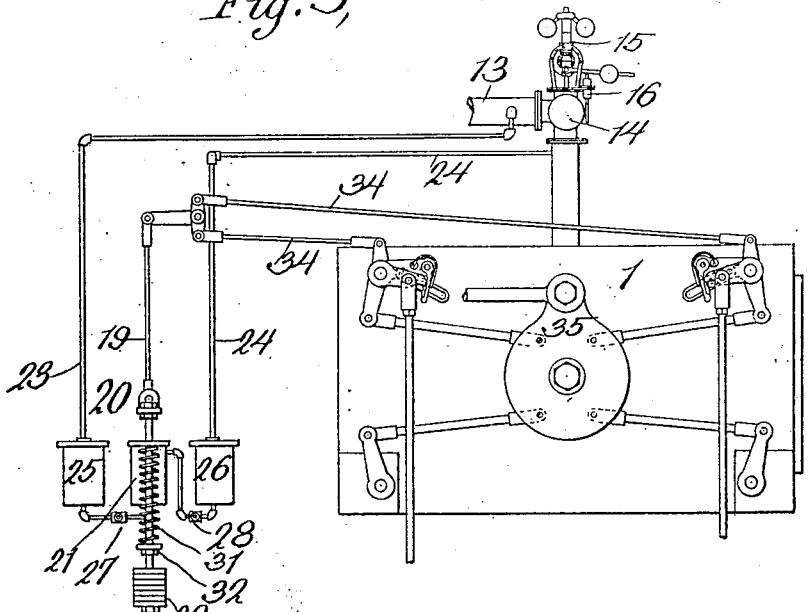
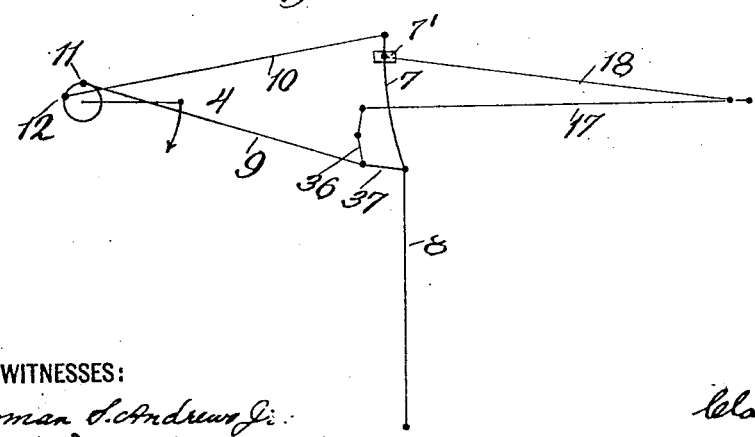
WITNESSES:
INVENTOR
Clarence A Dawley
BY
ATTORNEYS C. A. DAWLEY.
GOVERNING VALVE GEAR FOR FLUID PRESSURE MOTORS.
APPLICATION FILED JULY 26, 1906.
1,042,534.
Patented Oct. 29, 1912.
4 SHEETS—SHEET 4.
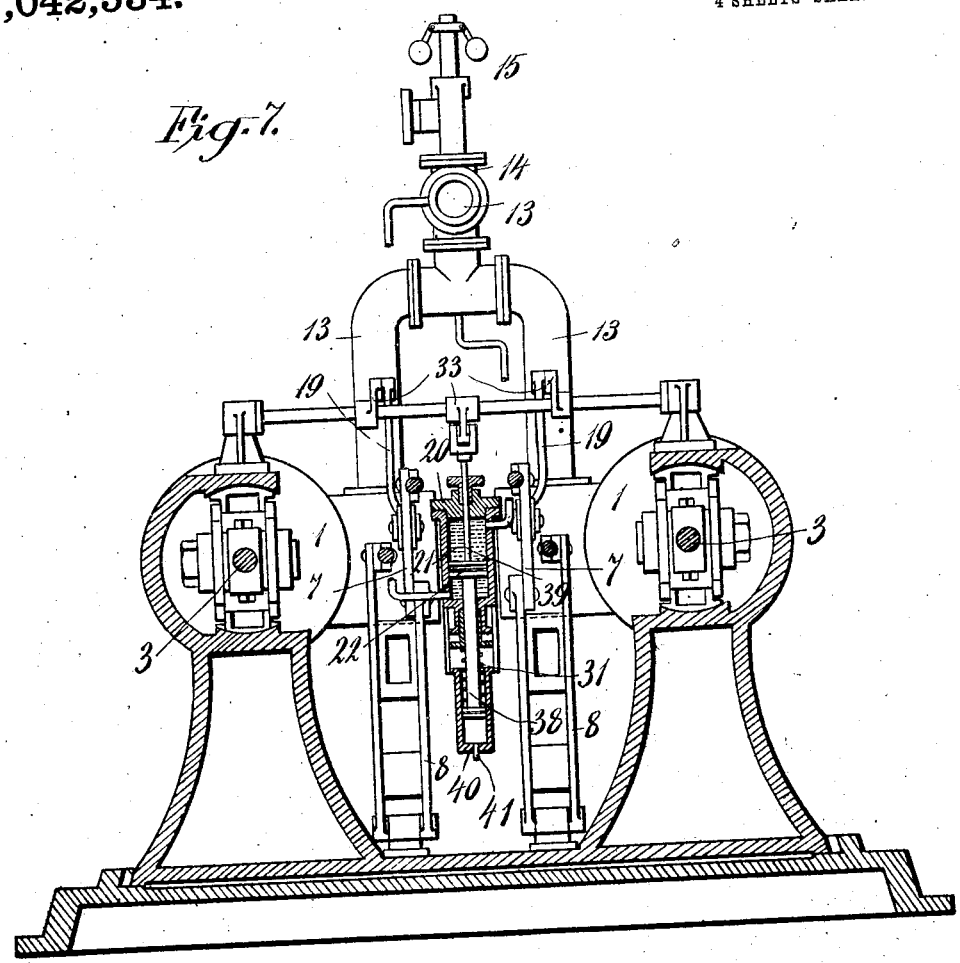
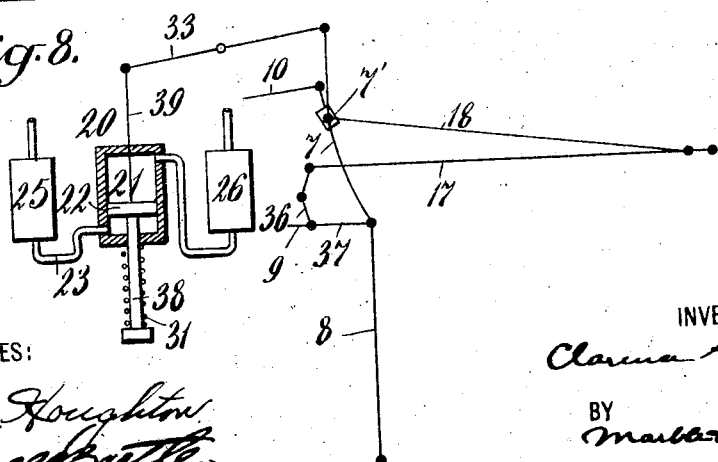
WITNESSES:
INVENTOR
BY
ATTORNEYS

UNITED STATES PATENT OFFICE.

CLARENCE A. DAWLEY, OF PLAINFIELD, NEW JERSEY.

GOVERNING VALVE-GEAR FOR FLUID-PRESSURE MOTORS.

1,042,534.　　　　Specification of Letters Patent.　　Patented Oct. 29, 1912.

Application filed July 26, 1906. Serial No. 327,941.

*To all whom it may concern:*

Be it known that I, CLARENCE A. DAWLEY, a citizen of the United States, residing at Plainfield, Union county, New Jersey, have invented certain new and useful Improvements in Governing Valve-Gear for Fluid-Pressure Motors; and I do hereby declare the following to be a full, clear, and exact description of the same, such as will enable others skilled in the art to which it appertains to make and use the same.

My invention relates to improvements in governing valve gear for fluid pressure motors, and comprises means for obtaining instantaneous control of the motor by means of a throttling governor, combined with means for adjusting the point of cutoff to permit reopening of the throttle valve without changing the speed of the engine.

My invention is particularly intended to be applied to air compressors, blowing engines, pumps and the like.

I will particularly describe my invention herein with reference to its use in air compressors, but wish it to be understood that I do not thereby limit the uses to which the invention may be put.

In air compressors, it has been found desirable to use valve gears which give little or no compression in the steam cylinders, and hence Corliss and other four-valve gears, or Meyer or other riding cutoff gears, are commonly employed. The point of cutoff is in many cases adjustable by hand, particularly when the Meyer valve gear is employed, the machine being controlled automatically by governing means which limits the speed, and also, usually, slows the machine down if the desired pressure is exceeded. This is accomplished usually by a throttle valve operated jointly by a fly-ball governor and a pressure governor.

Air compressors are usually variable speed machines, and to avoid centering and stalling on slow speeds, also to allow for variable steam pressure, the attendants usually run the machines with a cutoff much later than necessary; and in fact, it is usually found that the cutoff is set as late as possible to avoid trouble in starting.

There are two important reasons why heretofore adjustment of cutoff in these machines has not usually been made automatically. The point of cutoff might indeed be adjusted automatically by employing balanced cutoff valves operated by a shifting eccentric governor or some recognized equivalent thereof, such as a centrifugal governor adjusting the position of the block of a Stevenson link valve gear; but it is difficult to add to any such valve gear, means for varying the point of cutoff to correspond to air pressure variation; in other words, it is difficult without extreme complication to make any of the ordinary automatic cutoff valve gears involving a shifting eccentric or its equivalent, automatically adjustable according to variations both of speed and pressure. It is further a prime requisite that the governor shall be sensitive to small changes in air pressure, and shall be extremely rapid in response to changes in pressure; for sluggishness in response to such changes in pressure may result in accident to the machine; and ordinary variable cutoff valve gears have not been considered sufficiently responsive to meet this requirement. According to my invention, I overcome these difficulties which heretofore have been presented, by controlling the speed of the engine by means of a throttle valve automatically controlled by a speed governor and, if desired, automatically controlled by a pressure governor as well, and I further provide variable cutoff valve gear, and fluid-pressure-actuated means operated by differences in pressure on the two sides of the throttle valve, for adjusting the point of cutoff. In such a valve gear, when changes in speed occur or when the desired pressure is exceeded, the throttle valve is adjusted instantaneously and immediately thereafter the adjustment of the point of cutoff begins, the throttle valve gradually opening automatically as the cutoff grows earlier; and by this means I am able to obtain the same instantaneous control of the compressor characteristic of the combined speed and pressure controlled throttling governors now commonly employed, and at the same time I am able to operate the compressor at points of cutoff giving good economy.

The objects of my invention are therefore to improve the efficiency and economy of fluid pressure motors, and particularly compressors, blowing engines, pumps and the like; to provide for rapid and sensitive control of the engine both for speed variations and pressure variations, and likewise to adjust automatically the point of cutoff to correspond to the conditions under which the machine works; to improve the action of two-eccentric valve gears; and to make the mechanism simple, relatively inexpensive, compact, easy in action, and reliable.

I will now proceed to describe my invention with reference to the accompanying drawings in which certain forms of valve gear embodying said invention are illustrated, and will then point out the novel features in claims.

Figure 4:
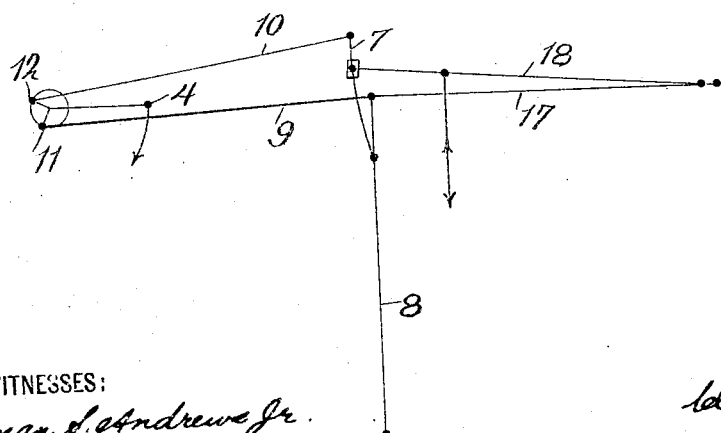

In the said drawings: Figure 1 shows a top view and partial section of a tandem air compressor with riding cutoff valve gear, embodying my invention; Fig. 2 shows a side elevation of the said compressor and valve gear, and Fig. 2ª shows a detail front view of the rocker-arm of said valve gear. Fig. 3 is a diagrammatic and partly sectional view illustrating the relative connections and arrangement of the throttle governor and the fluid-pressure-actuated means for operating the variable cutoff gear. Fig. 4 is a skeleton diagram of the variable cutoff gear shown in Figs. 1 and 2. Fig. 5 is a diagram illustrating the application of my invention to Corliss valve gears. Fig. 6 is another skeleton diagram of an alternative link valve gear which may be employed in engines having my governing mechanism. Fig. 7 shows a transverse section of a duplex machine, illustrating means whereby one fluid-pressure-actuated cutoff changing means controls the cutoff of both cylinders; said view also illustrating an alternative form of said fluid-pressure-actuated cutoff varying means, and Fig. 8 is a diagram of the valve gear of Fig. 7.

Referring first to Figs. 1-4 inclusive, 1 designates the steam cylinder of the engine, 2 the compression cylinder, 3 the connecting rod, 4 the crank, 5 the main valve, 6 the riding valve, 7 a slotted link pivoted at its lower end to a rocker 8, and 9 and 10 the eccentric rods of eccentrics 11 and 12 respectively.

13 designates the pipe through which steam or motive fluid is supplied to the engine and 14 is a governing throttle valve arranged to be controlled jointly by a flyball governor 15 and a pressure governor 16, both of familiar construction and acting jointly upon the throttle valve in a manner well known.

The main steam valve 5 is reciprocated by means of a valve rod 17 connected to rocker 8, and the movement of this valve is not varied by the governing mechanism. The riding valve 6 is reciprocated by means of a valve rod 18 connected to a sliding block in the link 7; and the position of this block in the link, and therefore the point of cutoff, is arranged to be varied by means of a rod 19 actuated by fluid-pressure-actuated means 20, shown in detail in Fig. 3. This fluid-pressure-actuated means 20 comprises a fluid pressure cylinder 21 having within it a piston 22 connected to rod 19; and the opposite ends of said cylinder 21 are connected by pipes 23 and 24 respectively to the main steam pipe 13 on opposite sides of the throttle valve 14. In pipes 23 and 24 are included oil reservoirs 25 and 26 respectively, which act as dash pots to render gradual the motion of the piston 22 in cylinder 21, and so to regulate the rate of change of cutoff and cause the piston 22 to move smoothly and without fluctuation. I customarily provide pipes 23 and 24 with regulating cocks 27 and 28.

The piston 22 is weighted, having sectional weights 29 suspended from it by means of a yoke 30 (Fig. 2) and I also customarily provide springs 31 acting in the same manner as the weights and adjustable as to tension by means of screw nuts 32. The purpose of these springs is to give a gradually increasing resistance as the piston goes up. By means of these weights and springs the engine is given an initial tendency to run with a cutoff later than would be required to give the desired speed with the throttle valve wide open, and thus the engine is caused to run normally with the throttle valve somewhat closed; this being necessary in order that there may be normally some difference between the steam pressure on the two sides of the throttle valve, so that the cutoff will be made later in case the difference between the pressures on the two sides of the valve falls below normal.

The operation of this form of valve gear is as follows: Supposing the machine to be in operation, in case it exceeds the normal speed to which the speed governor 15 is adjusted, said governor immediately closes the throttle valve 14 partly, so as to reduce the engine speed to normal; and the difference in the steam pressure on the two sides of the valve 14 being thereby made greater than normally, piston 22 is caused to move upward gradually, thus readjusting the link motion to give an earlier cutoff. As the cutoff grows earlier the governor 15 automatically opens the throttle valve 14 wider until, said throttle valve being at its normal opening and the point of cutoff correspondingly adjusted by the fluid-pressure-actuated adjusting device 20, the engine runs steadily under its reduced load and earlier cutoff. Should the speed of the engine fall below normal, the speed governor 15 opens the throttle valve wider than normal, thus raising the engine's speed and at the same time making less than normal the difference between the pressures on the two sides of the throttle valve; the piston 22 being then drawn downward so that the point of cutoff is made later; and as the speed of the engine gradually rises with the longer cutoff, the throttle valve 14 is automatically closed until its normal degree of opening is reached.

In case the throttle valve 14 is operated by the weighted pressure governor 16, as it may be if the receiver pressure rises above or falls below normal, the cutoff adjusting device 20 operates in the same manner to adjust the cutoff to the new conditions under which the engine is running, the throttle valve being then shifted by the fluid pressure governor 16 to its normal position.

Obviously the same speed and pressure governing mechanism, and the same cutoff adjusting mechanism, may be used for all the cylinders of a multi-cylinder engine. In Fig. 7 I have illustrated this in connection with a compressor of the so-called duplex type, both power cylinders of which are supplied with steam from the same pipe 13 through the same throttle valve 14 operated by a single speed governor 15 and a single pressure governor 16; and a single cutoff-adjusting device 20 has its piston rod connected through suitable links 33, shown, to rods 19, by which the link valve motion is adjusted for different cutoffs.

The same governing arrangement is applicable to the various forms of drop cutoff valve gear. In Fig. 5 I have shown the same adapted to one of the well known types of Corliss valve gear, 35, wherein the governing device 20 operates the rod 34 by which the position of the tripping cams of the Corliss valve gear is regulated, the same as said rod and cams are ordinarily operated and adjusted by a fly-ball governor. I do not illustrate in detail these tripping cams or the construction of the Corliss valve gear, as the same are well known to those skilled in the art.

The valve gears shown in Figs. 1, 2, 4, 6, 7 and 8 are shown as applied to engines having a main eccentric controlling admission and exhaust, and a so-called cutoff eccentric, though the point of cutoff is actually determined by the joint action of both eccentrics. As shown in Fig. 2, and more clearly in the diagram, Fig. 4, the cutoff link 7 is pivoted at its lower end to the rocker 8, and therefore the block 7' of this link when at the lower end thereof, is driven practically exclusively by the main eccentric 11 by which the main valve 5 is driven. When the cutoff block is at the lower end of the link, therefore, the cutoff is the longest. When said block is at the upper end of the link, on the other hand, its motion is a resultant of the motions of the two eccentrics 11 and 12, eccentric 12 so modifying the actions of eccentric 11 that the cutoff is early. By so compounding the motion of the main eccentric with that of the cutoff eccentric 12, I am able to obtain a much better valve action than is obtained from ordinary link motions.

An alternative to this valve gear is shown diagrammatically in Fig. 6, wherein the motion of the main eccentric 11 is transmitted through eccentric rod 9 to a motion-reversing rocker 36 and thence to the valve rod 17, said eccentric rod 9 being connected in this case to the rocker 8 through a connection 37. The effect of this valve gear is in substance the same as of that shown in Fig. 4, except that cutoff is earliest when the block 7' is at the bottom of the link, and is latest when said block is at the top of the link; an arrangement that is at times desirable.

In Figs. 7 and 8 I also illustrate an alternative construction of the fluid-pressure-actuated cutoff adjusting device, whereby the use of the weights 29 is avoided. Instead of using such weights I provide the piston 22 with a guide rod 38 of a diameter sufficiently greater than that of the piston rod 39, to create normally on the upper side of the piston, an excess of pressure, causing a normal downward thrust on the piston corresponding to that produced by the weights 29 in the arrangement shown in Fig. 3. The effect is obviously the same as that of the weights 29 in Fig. 3. I also show, in Fig. 8, a single spring 31, corresponding to springs 31 of Figs. 2, 3 and 5, mounted on the guide rod.

In Fig. 7 I further show the guide rod 38 forming the piston of a pressure cylinder 40, which at the lower end is provided with a pipe 41 which may lead to a receiver into which the machine compresses, or to any other source of fluid under pressure with respect to which the machine is to be regulated. Increase of pressure underneath the guide rod piston causes the guide rod to rise, thus adjusting the valve gear for an earlier cutoff; and conversely, decrease of pressure underneath the guide rod causes the same to descend. This cylinder 40 is in fact, the equivalent for the pressure governor 16, of Fig. 2, and when present said pressure governor 16 may be omitted from the throttling governor in many cases; though it is often desirable to retain said pressure governor 16, setting the latter to operate at some limiting pressure which it is not desired to exceed; pressure governor 16 then forming a safety device.

What I claim is:—

1. In an engine, the combination with variable cut-off valve gear, and throttling governing means, of cutoff-changing means, actuated by differences in pressure on opposite sides of said throttling means, for adjusting the point of cutoff.

2. In an engine, the combination with variable cutoff valve gear, and throttling governing means, of fluid-pressure-actuated means, connected to opposite sides of said throttling means and arranged to be actuated by differences in pressure on opposite sides thereof, and connected to said valve gear to adjust the point of cutoff.

3. In an engine, the combination with variable cutoff valve gear, and throttling governing means, of cutoff-changing means, actuated by differences in pressure on opposite sides of said throttling means, for adjusting the point of cutoff, and loaded to cause partial closing of said throttling means at loads below maximum.

4. In an engine, the combination with variable cutoff valve gear, and throttling governing means, of cutoff-changing means, actuated by differences in pressure on opposite sides of said throttling means, for adjusting the point of cutoff, and having loading means to cause partial closing of said throttling means at loads below maximum, comprising means which increases the load as cutoff grows earlier.

5. In an engine, the combination with variable cutoff valve gear, and throttling governing means, of cutoff-changing means, actuated by differences in pressure on opposite sides of said throttling means, for adjusting the point of cutoff, and having loading means to cause partial closing of said throttling means at loads below maximum, comprising a spring which increases the load as cutoff grows earlier.

6. In an engine, the combination with variable cutoff valve gear, and throttling governing means, of fluid-pressure-actuated means connected to opposite sides of said throttling means and arranged to be actuated by differences in pressure on opposite sides thereof, and connected to said valve gear to adjust the point of cutoff, and regulating means interposed between said fluid-pressure-actuated means and said throttling means, whereby the change of cutoff is regulated.

7. In an engine, the combination with variable cutoff valve gear, and throttling governing means, of cutoff-changing means, actuated by differences in pressure on opposite sides of said throttling means, for adjusting the point of cutoff, and regulating means therefor.

8. In an engine, the combination with variable cutoff valve gear, and throttling governing means, of cutoff-changing means, actuated by differences in pressure on opposite sides of said throttling means, for adjusting the point of cutoff, and fluid-pressure means preventing sudden fluctuations or changes in cutoff.

9. In an engine, the combination with variable cutoff valve gear, and throttling governing means, of means for adjusting said valve gear comprising a cylinder and piston, opposite sides of said cylinder being connected to opposite sides of said throttling means.

10. In an engine, the combination with variable cutoff valve gear, and throttling governing means, of means for adjusting said valve gear comprising a cylinder and piston, and loading means tending to operate the same for a longer cutoff, opposite sides of said cylinder being connected to opposite sides of said throttling means.

11. In an engine, the combination with variable cutoff valve gear, and throttling governing means, of means for adjusting said valve gear comprising a cylinder and piston, and loading means tending to operate the same for a longer cutoff, and including means which increases the load as cutoff grows earlier, opposite sides of said cylinder connected to opposite sides of said throttling means.

12. In an engine, the combination with variable cutoff valve gear, and throttling governing means, of means for adjusting said valve gear comprising a cylinder and piston, and loading means tending to operate the same for a longer cutoff, and including a spring which increases the load as the cutoff grows earlier, opposite sides of said cylinder being connected to opposite sides of said throttling means.

13. In an engine, the combination with variable cutoff valve gear, and throttling governing means, of means for adjusting said valve gear comprising a cylinder and piston, and means connecting opposite ends of said cylinder to opposite sides of said throttling means comprising chambers of relatively large area as compared with the area of the ports connecting the same with said cylinder, interposed between the cylinder and said throttling means.

14. In an engine, the combination with variable cutoff valve gear comprising a block and link, and throttling governing means, of fluid-pressure-actuated operating means, connected to opposite sides of said throttling means, and arranged to adjust said block with respect to said link to adjust the point of cutoff.

15. In an engine, the combination with valve gear comprising main and cutoff valves, and means for actuating the same comprising, for the cutoff valve, a block and link, and throttling governing means, of fluid-pressure-actuated operating means, connected to opposite sides of said throttling means, and arranged to adjust said block with respect to said link to adjust the point of cutoff.

16. In an engine, the combination with variable cutoff valve gear and throttling governing means, of cutoff-changing means actuated by differences in pressure on opposite sides of said throttling means, and comprising a cylinder and piston, opposite sides of said cylinder connected to opposite sides of said throttling governing means, and an auxiliary cylinder having its piston in operative connection with the piston of said first cylinder and adapted for connection to a source of supply of fluid under pressure.

17. A fluid pressure engine comprising in combination, an element for controlling the speed of the engine, and a second element controlled by the first element for varying the point of cut-off in fixed relation to variations of pressure.

18. A fluid pressure engine comprising in combination, an element acting automatically to control the speed of the engine, a second element controlled by the first element for varying the point of cut-off, and means constantly opened connecting said second element to the working-fluid-supply means of the engine, for communicating the pressure of the working fluid to said second element.

19. A fluid pressure engine comprising in combination, an automatic device for regulating the pressure of the entering fluid to control the speed of the engine, and a supplementary device operated by pressure derived from fluid which has passed the automatic device for varying the cut-off in fixed relation to variations of pressure.

20. A fluid pressure engine comprising in combination, a throttling device arranged to regulate the pressure of the entering fluid to control the speed, a cut-off valve, operating means therefor, a device operated by pressure derived from fluid which has passed the throttling device, and connections therefrom to the operating means for the cut-off valve arranged to vary the point of cut-off with variations of pressure.

21. A fluid pressure engine comprising in combination, a throttling device arranged to regulate the pressure of the entering fluid to control the speed, a cut-off valve, actuating means therefor, connections from the actuating means to the cutoff valve, a device operated by pressure derived from fluid which has passed the throttling device and acting on the actuating connections to the cutoff valve, and arranged to vary the point of cutoff with variations of pressure.

22. A fluid pressure engine comprising in combination, an automatic governor arranged to regulate the pressure of the entering fluid to control the speed under all loads, a cut-off valve, actuating means therefor, and means operated by pressure derived from fluid which has passed the governor and acting on the actuating means for the cut-off valve and arranged to vary the points of cut-off with variations of fluid pressure.

In testimony whereof I affix my signature, in the presence of two witnesses.

CLARENCE A. DAWLEY.

Witnesses:
D. HOWARD HAYWOOD,
H. M. MARBLE.